United States Patent [19]

Roberts

[11] 4,029,244

[45] June 14, 1977

[54] COLLAPSIBLE RECEPTACLE TYPE STAND FOR USE IN TRANSPORTING LOADED GROCERY BAGS

[76] Inventor: Izora M. Roberts, 7215 NE. 175th, Sp 124, Bothell, Wash. 98011

[22] Filed: Dec. 29, 1975

[21] Appl. No.: 644,720

[52] U.S. Cl. .............................. 224/42.42 R; 220/6
[51] Int. Cl.² ...................... B60R 5/00; B65D 7/24
[58] Field of Search ............ 220/6, 7; 224/42.42R, 224/42.42 A, 42.03 A, 42.1 E, 42.41, 42.34, 42.36

[56] References Cited

UNITED STATES PATENTS

| | | | |
|---|---|---|---|
| 906,976 | 12/1908 | Weston | 211/85 |
| 1,489,527 | 4/1924 | Henry | 220/6 |
| 1,589,112 | 6/1926 | Chamberlain | 220/6 |
| 2,010,789 | 8/1935 | Roesel | 248/95 |
| 3,314,549 | 4/1967 | Goldreich | 211/132 |
| 3,315,835 | 4/1967 | Katzman | 220/6 |
| 3,404,818 | 10/1968 | Miscoe | 220/6 |
| 3,410,328 | 12/1968 | Sasi | 150/49 |
| 3,559,339 | 2/1971 | Worley | 47/45 |
| 3,848,748 | 11/1974 | Ceccarelli | 211/195 |

FOREIGN PATENTS OR APPLICATIONS 466,086  6/1950  Canada ................................. 220/6

*Primary Examiner*—George E. Lowrance
*Attorney, Agent, or Firm*—Graybeal, Barnard & Uhlir

[57] ABSTRACT

The stand is for use in a motor vehicle. It has open and closed positions and when fully open provides a pair of adjoining compartments for receiving loaded grocery bags. The walls of the stand prevent the bags from tipping when they are subjected to the inertial forces resulting from starting, stopping or turning of the transporting vehicle. The two compartments are independently foldable and are open at both top and bottom. The walls are pivotally connected at each corner to allow independent folding of the compartments between open in use positions for receiving a loaded grocery bag and closed positions for more compact storage in the transporting vehicle. Friction locks are provided at each pivot joint for overridably locking the stand in its open and closed positions.

5 Claims, 7 Drawing Figures

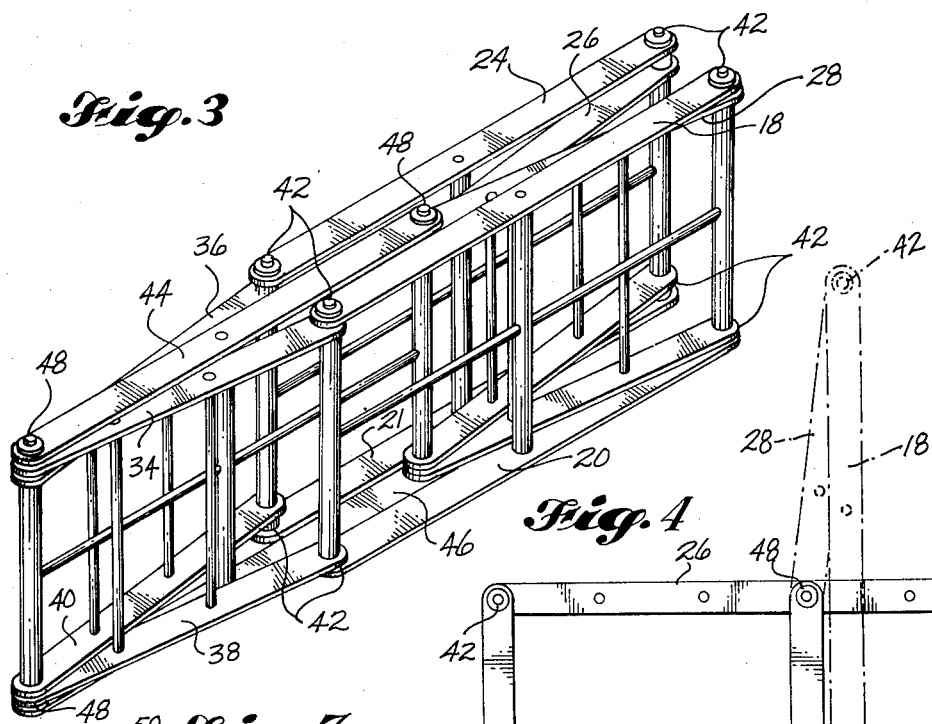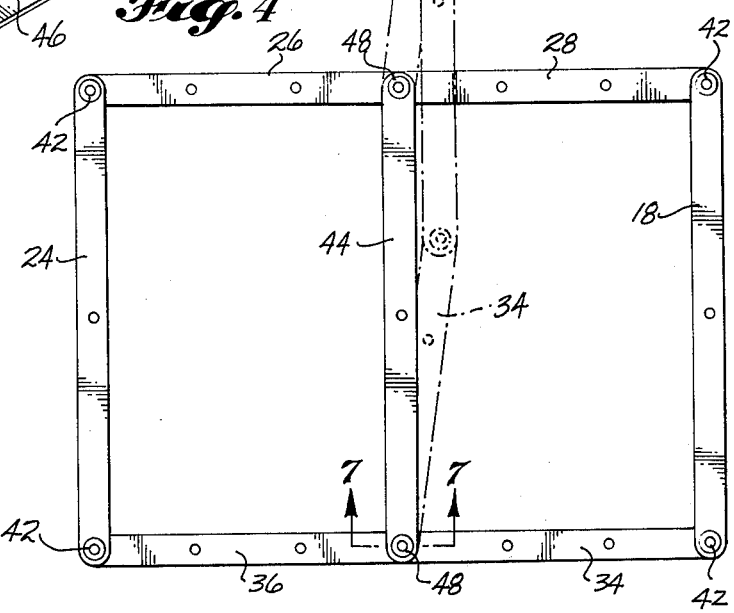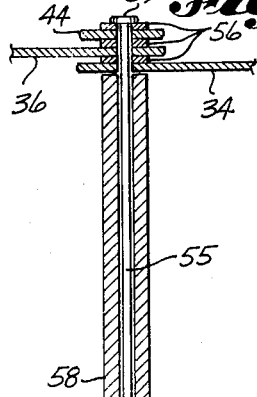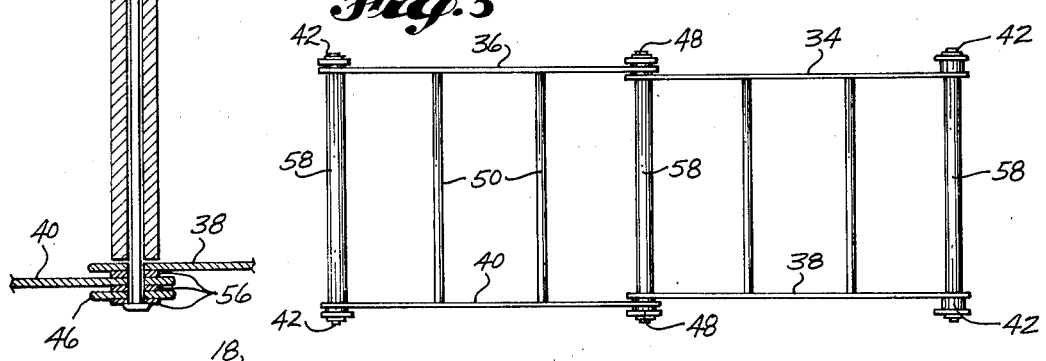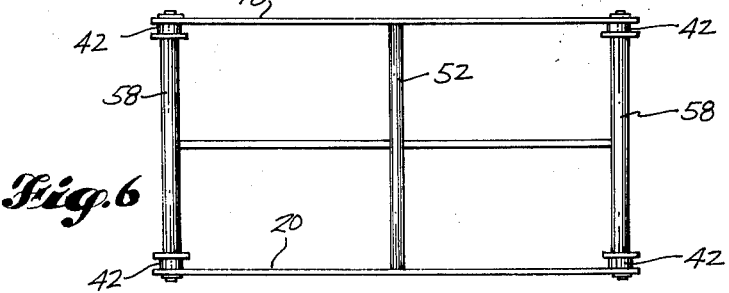

COLLAPSIBLE RECEPTACLE TYPE STAND FOR USE IN TRANSPORTING LOADED GROCERY BAGS

BACKGROUND OF THE INVENTION

1. Field of the Invention

The present invention relates to a collapsible stand for use in transporting loaded grocery bags, and more particularly, to a collapsible receptacle like structure having an open position for receiving loaded grocery bags to prevent tipping during stopping, starting or turning of a transporting vehicle and a folded position for storage when not in use.

2. Description of the Prior Art

Probably the most often used method of preventing loaded grocery bags from tipping is to place them in a cardboard box which are often available at a supermarket. This is unsatisfactory because if a loaded grocery bag is grasped at the top and lifted in an attempt to remove it from its transporting cardboard box, the wall of the bag often rips allowing the groceries to fall to the ground. Sometimes two or more grocery bags are placed in a single cardboard box at the supermarket. Accordingly, if the grocery bags are not individually removed, the cardboard box itself containing the weighty grocery bags must be lifted and moved into the house. In addition, cardboard boxes for transporting grocery bags are not always available at the store, in which case the loaded bags must be placed in the transporting vehicle without any supporting container. Accordingly, when the unsupported bags are subjected to inertial forces, such as during starting, stopping and turning, they sometimes tip over, spilling their contents over the floor of the transporting vehicle and often causing damage or breakage to grocery items.

Numerous types of structures have been proposed in the prior art to support bags or similar devices for a multitude of different uses. Of particular interest is U.S. Pat. No. 2,010,789, granted Mar. 8, 1934, to Adolph E. Roselle which discloses a basket like container for holding a paper bag in an upright position for use as a sanitary waste basket. This structure is unsuitable for use as a transportation stand for loaded grocery bags in an automobile due to its closed and elevated bottom. Also, it is not collapsible and presents a storage problem for this reason.

SUMMARY OF THE INVENTION

The present invention relates to a collapsible railed support stand for preventing loaded grocery bags from tipping during the stopping, starting or turning of the transporting vehicle.

According to an aspect of the invention, a collapsible stand comprises a spaced apart end and side rails defining a pair of compartments each of which receives a loaded grocery bag. A plurality of first and second pivotal joints allow the railed support stand to be moved between an open position receiving the loaded grocery bags and a collapsed or folded position for more compact storage.

According to another aspect of the invention, a collapsible rail support stand for preventing grocery bags from tipping includes an upper and lower rectangular portions having spaced apart end and side rails which are interconnected by first pivotal means. A plurality of risers are connected between the upper and lower rectangular portions and extend vertically providing a support device of sufficient height to prevent the loaded grocery bags from tipping.

According to still another aspect of the invention, an invertible stand having an open top and bottom is provided with spaced apart end and side walls to prevent a loaded grocery bag from tipping. Upper and lower rails are arranged in a planar configuration to support the stand on a horizontal surface in the transporting vehicle.

According to yet another aspect of the invention, a collapsible railed support stand is provided with a plurality of first pivotal joints interconnecting the side and end members and second pivotal joints interconnecting the side and intermediate members thereby forming a pair of compartments. Each compartment can be moved between its open and closed position independent of the other compartment.

Accordingly, in view of the foregoing, it is an object of this invention to provide a support stand for preventing grocery bags from tipping while being transported in a vehicle.

It is yet another object of the invention to provide a collapsible railed stand having an open position in which a pair of loaded grocery bags can be received in separate compartments and a collapsed position for compact storage when not in use.

It is still another feature of the invention to provide a collapsible railed support stand which can be lifted off a pair of loaded grocery bags at their destination for convenient removal of the bags from the transporting vehicle.

It is another object of the present invention to provide a support stand for loaded grocery bags which can be repeatedly used in transporting loaded grocery bags and stored in a collapsed position in the transporting vehicle.

Another object of the present invention is to provide a collapsible railed stand for loaded grocery bags requiring only a small space for storage when not in use.

Still another object of the present invention is to provide a collapsible rail support device for loaded grocery bags which can be set up in a few seconds time.

It is yet another object of the invention to provide a device for carrying loaded grocery bags which can be removed over the top of the sacks so that the sacks can be picked up by the bottom.

It is yet another object of the invention to provide an invertible stand having compartments with an open top and bottom to prevent a loaded grocery bag from tipping while transporting yet is removable for convenient lifting at the lower portion of the bag.

These and other features, objects and advantages of the present invention will be apparent from the following detailed description, taken in conjunction with the accompanying drawing.

BRIEF DESCRIPTION OF THE DRAWING

FIG. 3 is a pictorial view showing the stand in its folded position for more compact storage;

FIG. 4 is a top view of FIG. 2 showing the open portion of both compartments in solid lines and the collapsed position of one compartment in phantom;

FIG. 5 is a side elevation view of the stand shown in FIG. 2 illustrating the upper and lower side rails connected to a plurality of risers;

FIG. 6 is an end elevation of the collapsible stand shown in FIG. 2 showing an upper and lower end rails connected by a riser and an intermediate horizontal rail; and FIG. 7 is an axial view taken along line 7—7 of FIG. 4 depicting the connection of the second pivotal joint with the side rails and intermediate rail.

DESCRIPTION OF THE PREFERRED EMBODIMENT

Figure 1:
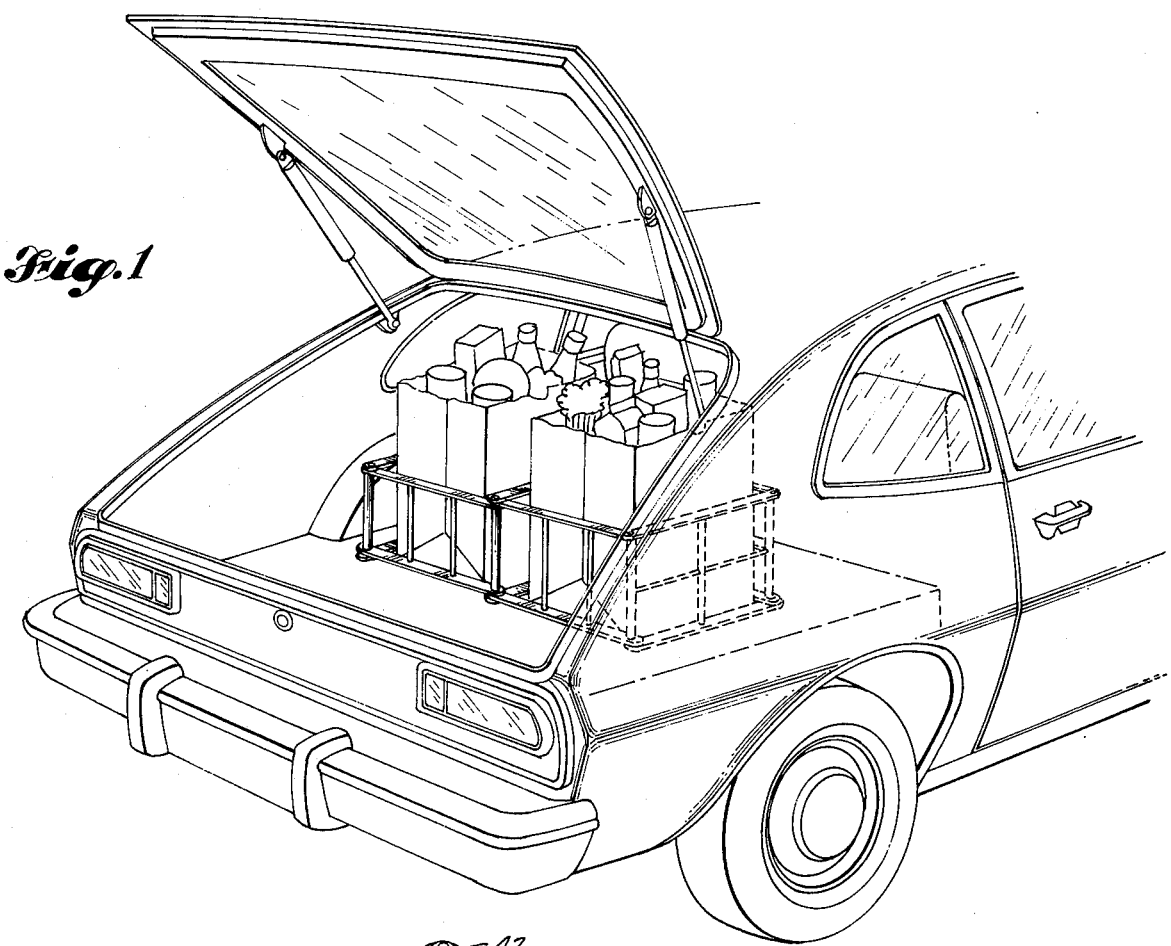
FIG. 1 is a pictorial view showing a collapsible stand constructed according to the instant invention and employing a pair of compartments in which a pair of loaded grocery bags are received for transporting in a vehicle.
Figure 2:
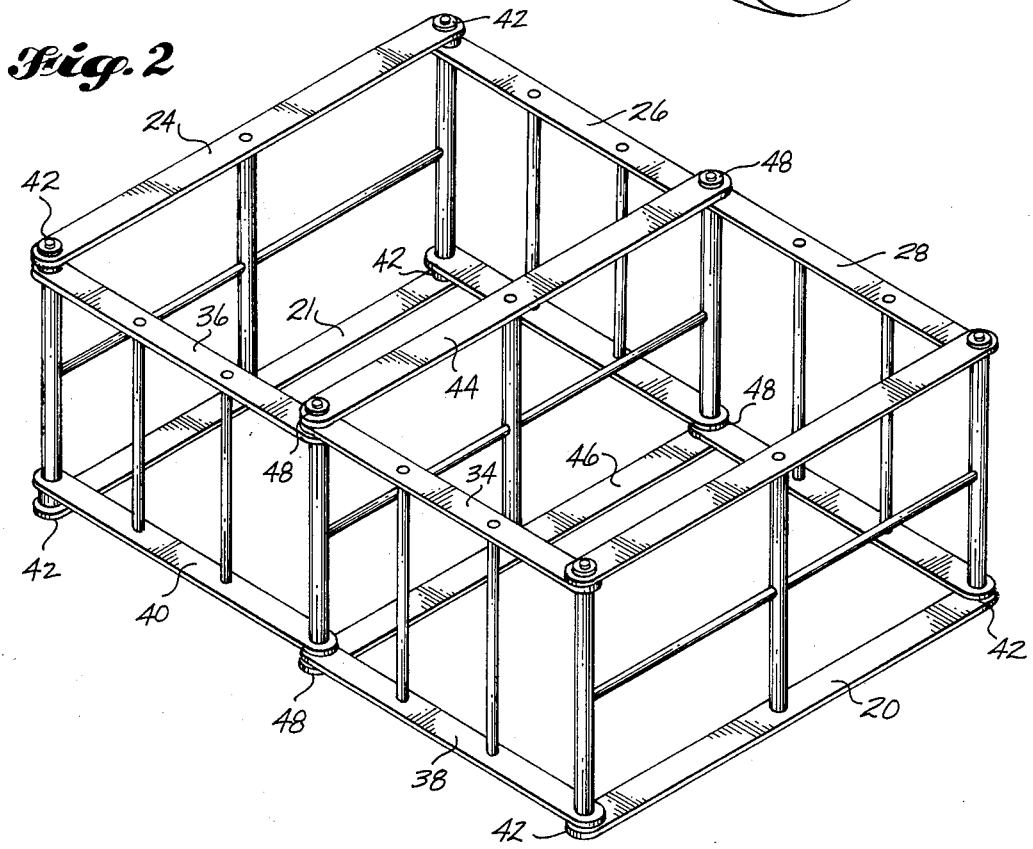
FIG. 2 is a pictorial view of a preferred embodiment of the instant invention depicting the open top and bottom compartments with spaced apart walls defined by the rail members.

Referring initially to FIG. 1, a collapsible stand 10 according to the instant invention is depicted on a horizontal surface 12 of a transporting vehicle. A pair of loaded grocery bags 14 and 16 are shown positioned therein in an upright position. As will be appreciated by those who transport loaded bags of groceries on a regular basis, it is essential to maintain the grocery bags in an upright position to prevent the contents from spilling when the transporting vehicle stops, starts or turns quickly. Additionally, when removing the grocery bags from the transporting vehicle, it is desirable to remove them one at a time by picking them up at the bottom; hence, the transporting support stand must be lifted off over the top of the loaded bags prior to their removal.

Referring now to FIGS. 2 and 4 – 6, it will be seen that, in preferred form, collapsible stand 10 according to the instant invention is rectangularly shaped having spaced apart open worked end and side walls with an open top and bottom. At one end, an upper and lower end rail 18 and 20, respectively, form part of an end wall of stand 10. At the opposite end, an upper and lower end rails 24 and 25, respectively, form part of the other end wall. One side wall is similarly formed by a pair of upper side rails 26 and 28 and a pair of lower side rails 30 and 32 which are interconnected at the approximate midpoint along the side wall. The opposite side wall is formed in part by upper side rails 34 and 36 and lower side rails 38 and 40, also interconnected at the approximate midpoint of the side wall. At each upper end lower corner a first pivotal joint 42 extends through aligned circular openings formed in the ends of adjacent rail members so that the end and side wall can rotate with respect to each other.

An intermediate wall is positioned between the end walls forming a pair of compartments having an open top and bottom for receiving loaded grocery bags. The intermediate wall includes an upper intermediate rail 44 and lower intermediate rail 46 which are interconnected at opposite ends by a second pivotal joint 48 to the respective side rails. The ends of the intermediate side and end rails have circular openings therethrough and are pivotally mounted on second pivotal joint 48 for rotational movement.

As has been previously indicated, collapsible stand 10 is movable between an open position in which a pair of grocery bags can be received and a collapsed position for more compact storage when not in use. Referring now to FIG. 3, the collapsible stand 10 according to the instant invention will be seen in its folded more compact position. In this configuration, the first pivotal joints 42 at the ends of each side wall have been moved toward each other. Accordingly, upper and lower end rails 18 and 20 of one end wall and upper and lower end rails 24 and 25 of the opposite end wall have been moved to a position of contiguous parallelism with upper and lower intermediate rails 44 and 46. In this more compact configuration, the stand can be conveniently stored, preferably in the transporting vehicle, so that it may be used at a subsequent time.

As is best seen in FIGS. 5 and 6, spaced apart walls are of an open work design and include a plurality of risers 50 connected between the upper and lower side rails which are approximately equally spaced between the first and second pivotal joints. In preferred form, there are four risers along each side wall equally spaced with respect to first pivotal axis 42 and second pivotal axis 48. Similarly, in preferred form, a single end riser 52 is connected between the upper and lower end rail approximately midway between the corners. A horizontal bar 54 is fixedly secured at its opposite ends midway between the upper and lower end rails and extends through each intermediate end riser 52. Preferably, the risers and horizontal bars are fabricated from circular stock such as doweling or the like and are fitted and glued into openings of a similar diameter on the mounting members. It should be understood that although the risers and horizontal bars add strength and rigidity to the collapsible stand, any number or none at all could be used in conjunction with the stand of the instant invention.

Referring now to FIG. 7, one of the four identical second pivotal joints interconnecting the intermediate and side rail members will now be described. A shaft 55 extends through aligned openings in the ends of both upper side rails 34, 36 and upper intermediate rail 44. An axially elongated spacer 58 has an axially extending passageway therethrough in which shaft 55 is loosely positioned. Upper head 59 tightly squeezes three friction washers 56 between the end portion of the rail members and end wall of spacer 58 forming a "friction lock". Accordingly, once collapsible stand 10 is moved to either its open or closed position it tends to remain in that configuration until the friction lock is forceably overriden by pivoting the respective rails about the pivotal joints. Similar aligned openings are formed in the end portions of lower side rails 38 and 40 and lower intermediate rail 46. In the same manner, three friction washers 56 are interspaced among the ends of the lower rail members and are squeezed against the lower end of spacer 58 by lower head 60.

Each first pivotal joint 42 located at each corner of collapsible stand 10 is formed in exactly the same manner as hereabove described in conjunction with second pivotal joint 48 except that only the end portion of the side and end rails are interconnected by the shaft. Additionally, as can be best seen in FIG. 5, the friction washers between the end and side rails at the right end (as depicted) are thicker than the similarly positioned friction washers at the left end. The increased thickness of the friction washers spacing upper and lower end rails 18 and 20 coplanarly align the rails with their corresponding end rail and intermediate rail. Accordingly, the weight of the stand is equally supported by the lower rail members and the planar configuration helps to prevent the stand from sliding on horizontal surface 12 in the transporting vehicle in response to inertial forces. If desired, the upper and lower heads of the pivotal joints may be knurled to additionally increase the friction of the stand with horizontal surface 12 in the transporting vehicle.

In utilizing the collapsible stand 10 according to the instant invention, the device is moved to its open position and placed on horizontal surface 12 in the transporting vehicle. Since the upper and lower parts are symetric, either the top or bottom rail members may be utilized as the lower rail members in contact with horizontal surface 12. In its open configuration the collapsible stand essentially forms two rectangular walled compartments without a top and bottom. As shown in FIG. 4, each compartment is movable independently between the open and closed positions so that a single compartment may be used when only one grocery bag is being transported. With the compartments in their open position, a loaded grocery bag can be easily positioned with its lower rail members resting on horizontal surface 12 of the transporting vehicle. The contact between the bottom of the loaded grocery bag in conjunction with that of the lower rail members help to maintain the grocery bags as initially positioned when subjected to inertial forces such as by the starting, stopping or turning of the transporting vehicle. However, even when the inertial forces acting upon the loaded grocery bag are of a sufficient magnitude to cause the grocery bags and stand to slide on horizontal surface 12, tipping is prevented by the side wall of the grocery bag bearing against the compartment walls of collapsible stand 10.

The collapsible stand of the instant invention has been shown fabricated of elongated rail and rod-like members; hence, any suitable material could be used which can be formed in these configurations as long as the basic components are as hereabove described. The rail and riser members in preferred form are constructed of wood; however, plastic or other similar materials could also be used. The friction washers are fabricated from a plastic or fiber material such that a high coefficient of friction will exist between the washer and the interleaved ends of the rail member at the pivotal joints.

Although the collapsible stand is particularly suited for preventing loaded grocery bags from tipping while being transported in a moving vehicle, it should be understood that different types of articles could also be supported in the compartments of the stand. For example, plants, tools and other similar items with a relatively high center of gravity are subject to tipping if subjected to the inertial forces caused by the starting, stopping or turning of a transporting vehicle. Accordingly, the open work walls of the individual compartments of the instant collapsible stand are sufficiently high to maintain such items in an upright position.

The above described embodiment is to be considered in all respects as merely illustrative and not restrictive. The scope of the invention is to be determined by the appended claims rather than by the foregoing description. It is intended that all changes in construction which come within the meaning and range of equivalency of the claims are to be embraced by the appended claims.

What is claimed is:

1. A collapsible stand for maintaining loaded grocery bags, or the like, in an upright position even when subjected to sudden inertial forces such as those caused by the stopping, starting or turning of the vehicle in which the grocery bags are being transported, comprising:

spaced apart, open-worked end and side walls defining an enclosure, wherein each end wall comprises an upper and lower end rail, and wherein each side wall comprises two upper side rails placed in end-to-end relation and two lower side rails placed in end-to-end relation;

first pivotal means to pivotally interconnect the end and side walls;

second pivotal means to pivotally interconnect the two upper side rails and the two lower side rails of each side wall;

an open worked intermediate wall, extending between the spaced apart side walls to divide the enclosure into a pair of adjacent compartments having the intermediate wall as a common wall, and comprising an upper and lower intermediate rail, wherein each end of the intermediate wall is pivotally connected to its respective side wall by its respective side wall's second pivotal means;

whereby the first and second pivotal means enable each adjacent compartment to be moved between an open position, for receiving a grocery bag which is prevented from tipping by bearing against the end, side and intermediate rails which surround it, and a collapsed position for more compact storage when not in use, wherein when both adjacent compartments are collapsed, the collapsed length of the stand is substantially equal to the length of the end wall plus one half of the length of one side wall.

2. A collapsible stand according to claim 1, wherein both ends of each end, side and intermediate rail have an opening, and wherein each first and second pivotal means comprises an axially elongated member pivotally cooperating with the openings, and wherein there are friction means positioned on each shaft to overridably lock the stand in its open or collapsed position.

3. A collapsible stand according to claim 2, wherein the end portions of the rails are thin, flat, and overlap at each first and second pivotal means, wherein the overlapping end portions of the rails at each first and second pivotal means are held in a tightly contacting relation by their respective pivotal means, and wherein the friction means comprises the tightly contacting, overlapping end portions of the rails.

4. A collapsible stand according to claim 3, wherein the lower end rails and the lower intermediate rail are coplanar and form a supporting base for the stand.

5. A collapsible stand according to claim 1, wherein the lower end rails and the lower intermediate rail are coplanar and form a supporting base for the stand.

* * * * *

UNITED STATES PATENT OFFICE
CERTIFICATE OF CORRECTION

Patent No. 4,029,244      Dated June 14, 1977

Inventor(s) Izora M. Roberts

It is certified that error appears in the above-identified patent and that said Letters Patent are hereby corrected as shown below:

Column 1, line 55, delete "a".

Column 1, line 64, delete "an".

Column 3, line 8, delete "an".

Column 3, line 37, delete "an"

Column 3, line 46, "end" should be -- and --.

Column 3, line 49, "wall" should be -- walls --.

Claim 1, column 6, line 37, "the", second occurrence, should be -- one --.

Signed and Sealed this

Thirteenth Day of September 1977

[SEAL]

Attest:

RUTH C. MASON  
*Attesting Officer*

LUTRELLE F. PARKER  
*Acting Commissioner of Patents and Trademarks*